Dec. 4, 1934.  H. P. VERDICH  1,983,108
REFLECTING DEVICE
Filed Feb. 21, 1934  2 Sheets-Sheet 1
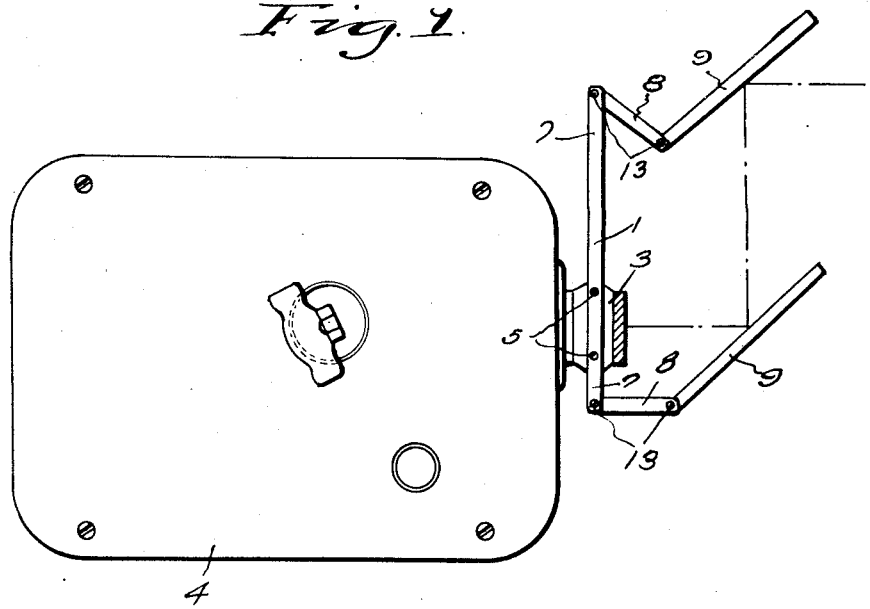
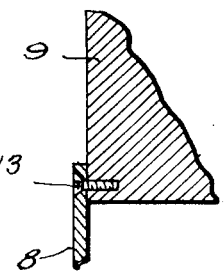
Inventor
H. P. Verdich
By Clarence A. O'Brien
Attorney Dec. 4, 1934. H. P. VERDICH 1,983,108
REFLECTING DEVICE
Filed Feb. 21, 1934. 2 Sheets—Sheet 2
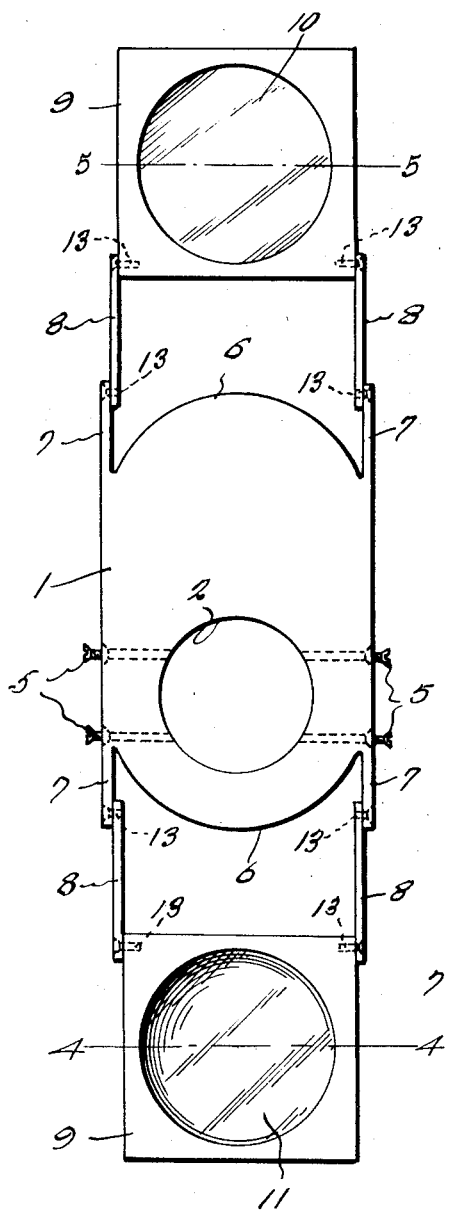
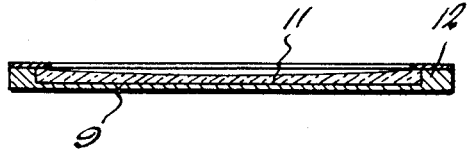
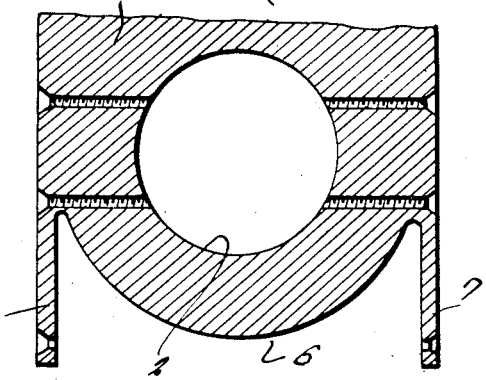
Inventor
H. P. Verdich
By Clarence A. O'Brien
Attorney Patented Dec. 4, 1934

1,983,108

UNITED STATES PATENT OFFICE 1,983,108

REFLECTING DEVICE

Hans Peter Verdich, Aberdeen, S. Dak.

Application February 21, 1934, Serial No. 712,413

3 Claims. (Cl. 88—1)

The present invention relates to new and useful improvements in reflecting devices for use in photography, photo-engraving work, on picture projectors, etc., and has for its primary object to provide, in a manner as hereinafter set forth, a device embodying a novel construction, combination and arrangement of parts through the medium of which depth will be given to the print or picture.

Another important object of the invention is to provide a reflecting device of the aforementioned character embodying a pair of coacting mirrors which may be conveniently adjusted to any desired position.

Still another important object of the invention is to provide a device of the character set forth embodying novel means for adjustably mounting the mirrors in position on a camera, projector or the like.

Other objects of the invention are to provide a reflecting device of the character set forth which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing the invention mounted in position for use on a camera.

Figure 2 is a side elevational view, showing the device in folded position.

Figure 3 is a view in front elevation, showing the device in extended or unfolded position.

Figure 4 is a sectional view, taken substantially on the line 4—4 of Figure 3.

Figure 5 is a sectional view, taken substantially on the line 5—5 of Figure 3.

Figure 6 is a vertical sectional view through the lower portion of the base.

Figure 7 is a fragmentary view in vertical section, showing the means for adjustably securing the mirror plates to the supporting links.

Referring now to the drawings in detail, it will be seen that the embodiment of the invention which has been illustrated comprises a substantially plate like base 1 of suitable material having a circular opening 2 in its lower portion for the reception of the lens holder 3 of a camera 4. The base 1 is secured in vertical position on the lens holder 3 of the camera through the medium of set screws 5 which are engageable with said lens holder.

The base 1 is provided with rounded upper and lower ends 6 from the sides of which integral legs 7 project. Links 8 are pivotally mounted for swinging adjustment on the free end portions of the legs 7. Pivotally mounted for swinging adjustment between the pairs of links 8 are recessed plates 9. Mounted in one of the plates 9 is a substantially flat or convex mirror 10 and mounted in the other plate 9 is a substantially concave mirror 11. The mirrors 10 and 11 may be secured in position in the plates 9 by any suitable means, such as retaining frames 12 mounted on said plates, as illustrated to advantage in Figures 4 and 5 of the drawings.

It will thus be seen that a reflecting device has been provided which may be expeditiously mounted in position for use on cameras, etc. The mirrors 10 and 11 are adjusted to an inclined position in spaced, opposed relation to each other, as best shown in Figure 1 of the drawings. When so mounted and adjusted on a camera the image is reflected by the upper mirror 10 into the lower mirror 11 and then to the camera lens, as is believed to be readily apparent. The plates 9 and the links 8 are frictionally retained in adjusted position through the medium of their securing screws 13.

It is believed that the many advantages of a reflecting device constructed in accordance with the present invention will be readily understood, and although a preferred embodiment of the invention is as illustrated and described, it is to be understood that changes in the details of construction, and in the combination and arrangement of parts may be resorted to which will fall within the scope of the invention as claimed.

Having thus described my invention, what I claim as new is:

1. In combination with a camera, a device comprising a supporting base, means for engaging the base on the camera, pairs of links pivotally connected to the supporting base for swinging adjustment, one pair above the lens of the camera and one below, and coacting mirrors pivotally connected for swinging adjustment between the pairs of links, one of said mirrors being substantially concaved, the other of said mirrors being substantially flat.

2. A device of the class described, comprising a supporting base mounted vertically on the lens holder of a camera, pairs of links pivotally mounted for swinging adjustment on the upper and lower ends of the supporting base, recessed plates pivotally mounted for swinging adjustment between the pairs of links, and coacting mirrors mounted in the recessed plates, one of said mirrors being substantially flat, the other of said mirrors being substantially concave.

3. A device of the class described comprising a substantially flat, plate-like base mounted vertically on the lens holder of a camera, said base having an opening therein for the reception of the lens holder, set screws threadedly mounted in the base and engaged with the lens holder for detachably securing said base in position, the base including rounded ends, integral legs projecting vertically from the side portions of the ends of the base, pairs of links pivotally mounted for swinging adjustment on the legs, recessed plates pivotally mounted for swinging adjustment between the pairs of links, and coacting mirrors mounted in the recessed plates, one of said mirrors being substantially flat, and the other of said mirrors being substantially concave.

HANS PETER VERDICH.